3,370,991
METHOD OF PREOXIDATION OF STAINLESS STEEL

Joseph J. Domicone, Elmira, and Percy L. Orr, Corning, N.Y., assignors to Corning Glass Works, Corning, N.Y., a corporation of New York
No Drawing. Filed May 31, 1963, Ser. No. 284,743
3 Claims. (Cl. 148—6.2)

This invention relates to stainless steel alloys used in metal-to-glass seals. More specifically the invention relates to a method of preparation of the surface of stainless steel parts prior to the sealing of such parts into glass.

There is disclosed in United States Patent 2,502,855, issued Apr. 4, 1950, to Walter E. Kingston for Preoxidation of Stainless Steel, a process or method of pre-oxidizing the surface of chrome-nickel steel parts to form a uniform thin chromium oxide layer as a preliminary step prior to sealing such parts into glass. The process disclosed in such patent has been found, however, to be difficult to consistently control in a manner that repeatedly resulted in satisfactory layers on each group of stainless steel parts processed in accordance with the disclosed process. This has resulted in a relatively high percentage of rejections of the parts and, of course, a substantial increase in the overall average cost of each of the parts having a satisfactory oxide layer. In addition, the process disclosed in said patent is relatively time consuming, expensive, and requires a substantial investment in special equipment and supplies. For these reasons a simpler method of treating stainless steel parts for purposes of metal-to-glass seals has long been sought.

It is, accordingly, the object of the present invention to provide a simple and relatively inexpensive method of preparing parts formed of a stainless steel alloy to provide satisfactory uniform thin oxide layers thereon which adhere tightly to the alloy surface for purposes of glass-to-metal seals.

In accomplishing the above object of the invention the desired metal oxide coatings are formed on each stainless steel part to be sealed into glass by subjecting each such part to an acid treatment and thereafter oxidizing the parts in air.

Other objects and characteristic features of the invention will become apparent as the description proceeds.

The invention is described as being applied to parts made from a nickel-iron-chromium alloy of the type disclosed in United States Patent 2,394,919, issued Feb. 12, 1946, to Walter E. Kingston for Metal-Glass Seal and Sealing Alloy. The process of the present invention is especially useful, for example, in treating parts made of a stainless steel alloy to provide a surface thereon for effecting exceptionally adherent seals in a glass article formed from a glass-making composition such as that disclosed in United States Patent 2,527,693, issued Oct. 31, 1950 to William H. Armistead for Soft Glass Having Wide Working Range, such patent being assigned to the assignee of the present application. However, stainless steel parts, treated by the process disclosed herein, are found to form satisfactory glass-to-metal seals when sealed into any type of glass having an acceptable coefficient of expansion relationship.

In accordance with the invention, a stainless steel part made from an alloy comprising approximately 42% nickel, 5 to 6% chromium and the balance substantially entirely iron, is first subjected to a degreasing bath comprising a solvent such as trichloroethylene, is then immersed for a period of time in a bath of acid or combinations of acids, and is finally subjected to oxidation in air for a period of time. Employing the acid bath and oxidation treatment, a stainless steel part, formed from an alloy such as previously mentioned and subjected to such treatment, was used in making a satisfactory glass-to-metal seal with a glass formed from a composition such as that disclosed in the previously cited patent to William H. Armistead. However, the treatment of similar stainless steel parts in the more specific manner outlined below is found to result in parts that produce an extremely satisfactory glass-to-metal seal with a glass of a composition such as that disclosed in the Armistead patent.

A part formed from a stainless steel alloy of the composition previously outlined is first degreased in trichloroethylene and is thereafter immersed in an acid bath comprising 20% nitric acid by weight in water for a period of from 2 to 10 minutes, such bath being maintained at a temperature between 160° and 180° F. Following removal from such bath the part is thoroughly water rinsed, dried and is then subjected to oxidation in air for one of a number of predetermined time-temperature schedules. Such oxidation may be performed by a flame from a torch, or by a heater or oven, and the oxidation of the stainless steel part at a temperature from approximately 1650° to approximately 1750° F. for a period of 30 seconds has been found to produce an oxide layer on the part which provides an extremely satisfactory glass-to-metal seal.

Stainless steel parts treated as outlined above have been found to provide a considerably more satisfactory glass-to-metal seal in subsequent sealing operations than those treated by the method disclosed in the aforementioned Kingston Patent 2,502,855, since the parts treated as disclosed herein become "wetted" to a substantially greater extent by the glass into which they are sealed, thereby providing a tighter, more adherent and better contoured seal.

The exact result produced in the surface of the alloy part treated as above is not entirely understood but it is believed that the acid bath so acts upon the surface of the part as to chemically remove more iron than chromium from such surface. The subsequent air oxidation of the surface of the part is thought to produce a layer of chromium oxide at the surface of the part with an outer layer of iron oxide of satisfactory but not excessive thickness. The iron oxide acts as a wetting agent and accounts for the greater "wettability" previously referred to. This layer of iron oxide is thought to be substantially dissolved in the glass during a sealing operation, and the final adherent and extremely tight seal is produced by contact of the glass with the under layer of chromium oxide.

The following treatments of the degreased stainless steel parts are also found to provide satisfactory oxide layers on the surface of the parts for purpose of glass-to-metal seals.

(1) The stainless steel parts are immersed in an acid bath comprising 5 to 10% nitric acid by weight in water for a period of 10 minutes, the temperature of the acid bath being maintained between 190 and 205° F. The parts are thereafter oxidized in air for a period of 30 seconds at a temperature of from 1650 to 1750° F.

(2) The stainless steel parts are subjected to a bath of 10% hydrochloric acid by weight in water at a temperature from 200 to 210° F. for a period of 10 minutes, and are thereafter immersed in bath comprising 20° nitric acid by weight in water at room temperature for a period of 5 minutes. The parts are subsequently oxidized in air as set forth above.

(3) A bath comprising an equal volume of 10% hydrochloric acid by weight in water and 10% nitric acid by weight in water is employed and the stainless steel parts are subjected to such bath for a period of 30 minutes, the temperature of the bath being maintained at a temperature between 160 and 180° F. Thereafter the parts are air oxidized for a period of 30 seconds as in the previous treatments.

A stainless steel part subjected to any one of the treatments outlined is found to produce an extremely adherent seal when sealed into a glass having a satisfactory coefficient of expansion relationship with the part. However, in the manufacture of certain electronic components such, as, for example, a cathode-ray or television tube envelope formed from a glass of the type disclosed in the aforesaid Armistead patent, while the required vacuum-tight seal is produced between a stainless steel anode button treated by any one of the methods outlined above and the tube envelope into which the button is sealed, any scaling of the portion of the anode button exposed to the interior portion of the subsequently exhausted tube cannot be tolerated. Anode buttons treated by the methods outlined above, while forming, as stated, extremely adherent vacuum-tight glass-to-metal seals, are found to scale to variable degrees and, therefore, in the treatments of such stainless steel parts, additional steps are introduced, as outlined below, whereby the scaling of such parts is eliminated.

Following exposure of the stainless steel parts to any one of the acid treatments outlined above and prior to the air oxidation of such parts, the parts are subjected to intermediate treatments comprising, immersing the parts for a period of approximately 30 minutes in a passivator comprising an equal volume of 20% nitric acid by weight in water and a 2% chromate solution, such as 2% sodium dichromate by weight in water, the temperature of the passivator being maintained between 100° and 130° F.; and further comprising, thereafter subjecting the parts for a period of approximately 60 minutes to a final bath comprising a 2% chromate solution, such as 2% sodium dichromate by weight in water, at a temperature between 130° and 150° F.

The introduction of the above intermediate passivating steps, in the previously outlined methods of treatment of stainless steel parts, is found to entirely eliminate the scaling of exposed portions of such parts during subsequent glass-to-metal sealing operations.

The following treatment of anode buttons, made from a stainless steel alloy such as that previously discussed, is also found to provide treated buttons which are non-scaling and result in forming extremely satisfactory glass-to-metal seals when the buttons are subsequently sealed into a cathode-ray or television tube envelope.

The anode buttons are first degreased as previously outlined and are then immersed in an acid bath comprising 5 to 10% nitric acid by weight in water for a period of 5 minutes, the bath being maintained at a temperature between 160 and 180° F. The buttons are thereafter thoroughly water rinsed, are then subjected to the above outlined passivation steps, and are finally air oxidized at a temperature between 1650 and 1750° F. for a period of 30 seconds.

Also, as outlined below, the introduction of a single intermediate passivating step in the previously outlined methods of treatment of stainless steel parts has been found to at least substantially reduce the scaling of exposed portions of such parts during subsequent glass-to-metal sealing operations.

Following exposure of the stainless steel parts to any of the acid treatments previously outlined and prior to the air oxidation of such parts, the parts are subjected to a passivator comprising an approximately 2% chromate solution at a temperature between 110° and 150° F. for a period of from 30 to 60 minutes. The parts are then air oxidized as previously discussed.

Although there is described herein only a few specific examples of the novel method of treating stainless steel parts preparatory to sealing such parts into glass, it is to be understood that various modifications of the method may be employed without departing from the spirit and scope of the appended claims.

Having thus described the invention, what is claimed is:

1. The method of treating the surface of chrome-nickel steel parts in preparation for sealing such parts into glass, said method comprising a first step of bathing the parts in an acid bath comprising 5 to 20% nitric acid by weight in water for a period of from 2 to 10 minutes and at a temperature between 160 to 210° F., a second step of bathing the parts in a first passivator comprising an equal volume of approximately 20% nitric acid by weight in water and approximately 2% sodium dichromate by weight in water at a temperature between 100° and 130° F. for a period of approximately 30 minutes, a third step of bathing the parts in a second passivator comprising approximately 2% sodium dichromate by weight in water at a temperature between 130° and 150° F. and for a period of approximately 60 minutes, and a fourth step of air oxidizing the parts at a temperature between 1650 and 1750° F. for a period of approximately 30 seconds.

2. The method in accordance with claim 1 and including a preliminary step of degreasing the steel parts in trichloroethylene.

3. The method of treating the surface of chrome-nickel steel parts in preparation for sealing such parts into glass, said method comprising the steps of degreasing the parts in a grease dissolving solvent, bathing the parts in a dilute nitric acid solution at a temperature between 160° and 210° F. for a period of from 2 to 10 minutes, thereafter subjecting the parts to a passivator comprising an approximately 2% chromate solution at a temperature between 110° and 150° F. for a period of from 30 to 60 minutes, and finally air oxidizing the parts for a period of approximately thirty seconds at a temperature between 1650 and 1750° F.

References Cited

UNITED STATES PATENTS

| | | | |
|---|---|---|---|
| 1,549,022 | 8/1925 | Otte | 148—6.14 |
| 2,175,771 | 10/1939 | Giles | 148—6.14 X |
| 2,502,855 | 2/1950 | Kingston | 148—6.35 |
| 2,584,354 | 2/1952 | Kissinger et al. | 148—6.35 X |
| 2,858,244 | 10/1958 | Long et al. | 148—6.35 X |
| 2,988,853 | 6/1961 | Certa et al. | 148—6.35 X |

RALPH S. KENDALL, *Primary Examiner.*